Sept. 8, 1931.   A. F. GILLET   1,822,343
AUTOMOBILE CHAIN ACCESSORY
Filed Sept. 24, 1930   2 Sheets-Sheet 1

Inventor
A.F.Gillet
By Arthur H. Sturges
Attorney

Sept. 8, 1931.  A. F. GILLET  1,822,343
AUTOMOBILE CHAIN ACCESSORY
Filed Sept. 24, 1930  2 Sheets-Sheet 2

Inventor
A.F.Gillet
By Arthur H. Sturges
Attorney

Patented Sept. 8, 1931

1,822,343

UNITED STATES PATENT OFFICE

ALEXIS F. GILLET, OF OMAHA, NEBRASKA, ASSIGNOR TO JUBILEE MANUFACTURING CO., OF OMAHA, NEBRASKA, A CORPORATION OF NEBRASKA

AUTOMOBILE CHAIN ACCESSORY

Application filed September 24, 1930. Serial No. 484,016.

The present invention relates to improvements in automobile chain accessories, and has for an object to provide an improved device for attaching cross anti-skid chains to automobile tires in which simplicity in construction and operation are had.

Another object of the invention is to provide an improved cross chain attaching device in which the parts are strong and rigid and will effectively lock the cross chain about the tire and prevent its being accidently jarred loose.

A further object of the invention resides in providing an improved cross chain fastening device which will co-operate with any standard form of rim and tire and which will form a unitary compact assemblage accessible for ready and easy operation.

A still further object of the invention is to provide an improved device for attaching and detaching the cross anti-skid chains in connection with automobile tires and wheels in which the device is constructed and intended to co-operate with the conventional form of cross chain without involving any modification of the chain and which will co-operate to draw the chain taut about the tire.

With the foregoing and other objects in view, the invention will be more fully described hereinafter, and will be more particularly pointed out in the claims appended hereto.

Figure 1:
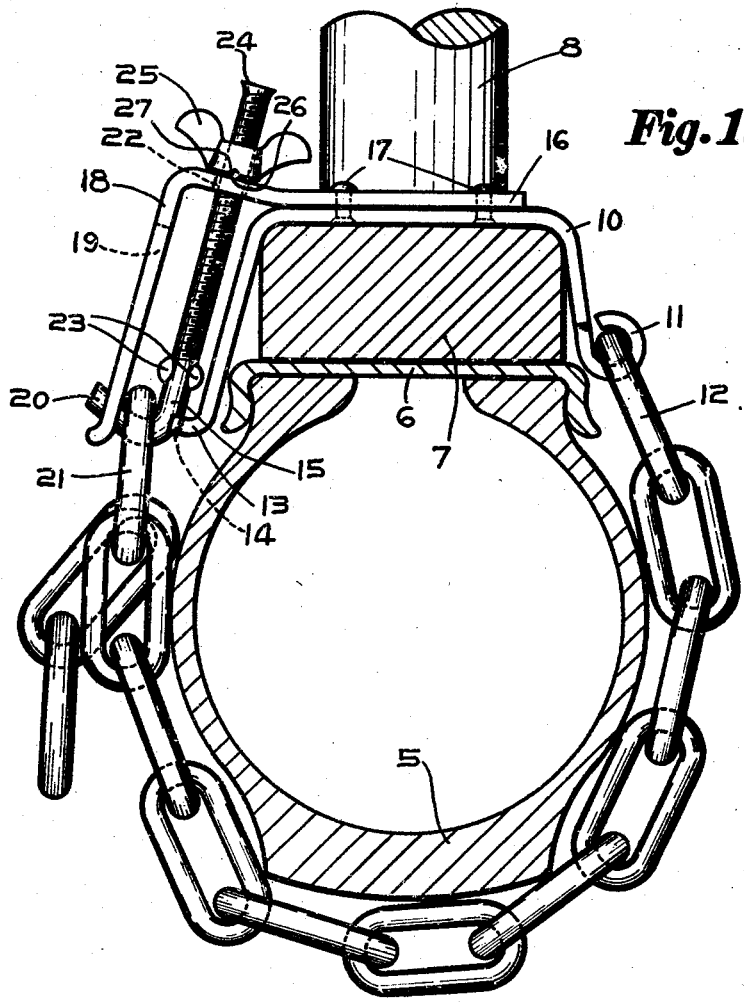

In the drawings, wherein like symbols refer to like or corresponding parts throughout the several views, Figure 1 is a fragmentary cross sectional view of a tire and wheel with the improved tire chain attaching device applied thereto.

Figure 2:
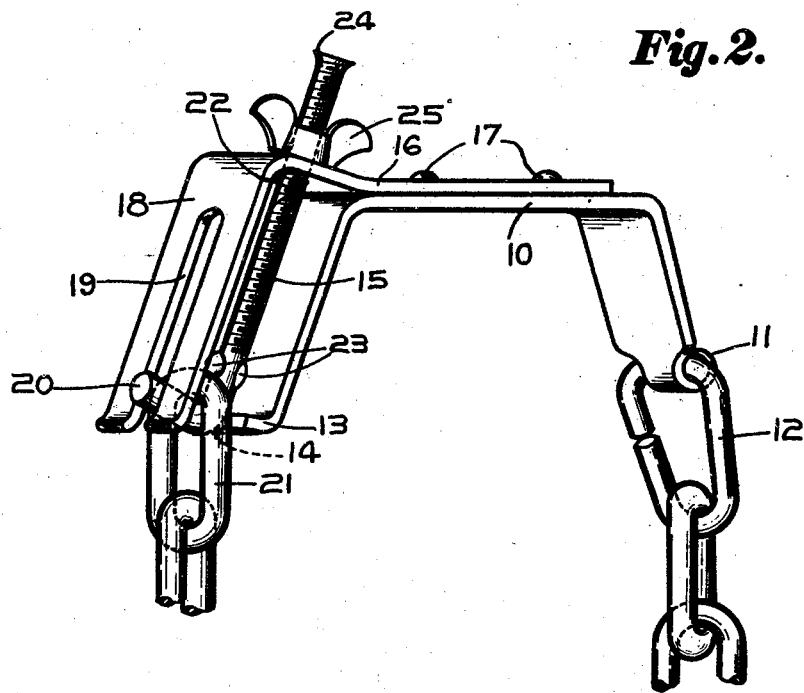
Figure 3:
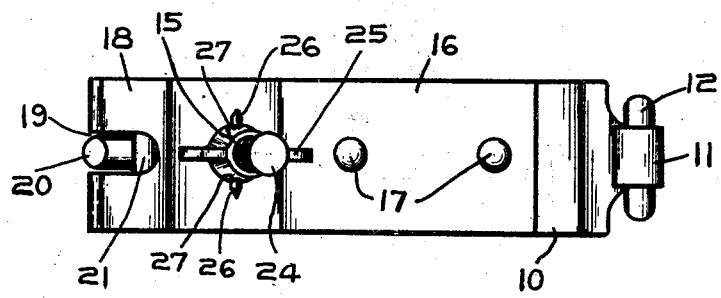

Figure 2 is a perspective view of the improved device with the end parts of the chain shown attached, and Figure 3 is a plan view of the improved attachment.

Referring more particularly to the drawings, 5 designates a pneumatic tire such as ordinarily used upon vehicles carried by the metallic rim 6 which is mounted upon the felly 7 of the wheel of the vehicle, the spokes of which are indicated at 8.

At 10 is indicated a saddle made of sheet metal or other appropriate material of a desired thickness, width and length to straddle the felly 7. This saddle is composed of a cross piece extending over the inside surface of the felly 7 and of two out-turned arms which extend outwardly at the sides of the felly. One arm is formed with an eye 11 for the purpose of receiving a terminal link 12 of an anti-skid cross chain which extends about the pneumatic shoe 5. The opposite arm of the saddle 10 is made with an out-turned flange 13 having a concave notch 14 against which an unthreaded side of a hook bolt 15 is adapted to seat and rest.

An arm 16 which may be also of metal of appropriate dimensions extends along the intermediate portion of the saddle 10 and is affixed thereto, as by the rivets 17 or other appropriate fastening means. The arms 16 extends outwardly beyond one side of the saddle 10 and carries an outwardly extending portion 18 which is in substantial parallelism with the adjacent outer end part of the saddle 10, although spaced therefrom an appropriate distance to permit of the bolt 15 being freely received between such parts.

A slot 19 is made in the arm part 18 for the purpose of receiving the terminal hook 20 on the bolt 15. This hook is bent outwardly at substantially right angles from the outer end part of the bolt and is opposed to that part of the bolt which seats in the notch 14. This slot 19 is open through its outer end to permit the bolt to readily move in and out from engagement with the arm part 18 whereby the opposite terminal link of the cross chain may be engaged and disengaged with the bolt. The arm part 18 forms in effect a keeper for the hook 20 of the bolt and prevents the terminal link 21 sliding off the same.

The hook end 20 of the bolt is preferably made at a slight inclination whereby to provide a socketed corner portion for receiving the link 21 and into which the link will automatically slide. The engagement of the hook 20 in the slot 19, will also prevent the rotation of the bolt 15 but will allow its axial sliding. It is obvious that if the bolt and hook 20 are allowed to turn, that the link 21 might escape therefrom and also it would be difficult to feed the bolt 15 axially back and forth as is necessary in the freeing and locking of the link 21.

Any link of the chain of course may be used as an end link and as indicated in Figure 1, two of the links have been discarded in favor of the third link numbered 21 which engages with the bolt. In this way a chain of any desired length may be used, such chain being of standard link construction and of the conventional form without involving any necessary modification in order to adapt it to the device according to the present invention.

Such a standard chain may by the use of the device be applied to tires of all sizes and shapes simply by the selection of a proper link to engage with the adjusting bolt.

The bolt 15 extends through an aperture 22 formed through the arm 16 adjacent its end portion 18. The bolt will slide axially freely through such perforation 22. Bosses or enlargements 23 are formed on the bolt near its outer or hook end. These enlargements are such as to prevent the bolt from being withdrawn in one direction through the aperture 22. The nut 25, which is threaded on the bolt 15, will prevent the bolt being pulled through the perforation 22 in the opposite direction, and the nut, which is preferably of a butterfly formation to facilitate manual rotation, cannot escape from the bolt 15 by reasons of the end 24 of such bolt being offset.

As best shown in Figure 3, the arm 16 is provided with lugs 26 adjacent the perforation 22 for the purpose of being received in notches or recesses 27 of the nut 25. By this means, vibration of the wheel will not be effective to relatively turn the nut and bolt and the wing nut will be maintained in fixed position after the chain is drawn taut by means of rotating the wing nut 25. The arrangement is preferably such that the notches 27 will pass over the lugs 26 when the chain is being tightened but an interlock will be effected between the parts 26 and 27 after such chain has been drawn taut.

In the use of the device, the parts are shown in Figure 1 in the position they occupy when the cross chain is applied to the wheel. In order to free the cross chain, the nut 25 is rotated upon the bolt 15 for the purpose of feeding the bolt 15 outwardly and permitting the hook 20 to pass out of the slot 19. In this condition of the parts, the hook 20 will be turned at right angles to the position it occupies when in the slot 19 and thus the chain link 21 may be slipped off the hook 20 and the chain and saddle removed from the tire and wheel.

The reverse process is performed in applying the device. When applied, the bolt 15 will be prevented from rotating and from escape and loss from the device.

The chain will be held tightly in place and any desired link of the chain may be engaged with the hook bolt. It will be appreciated that the link 12 of the chain can be engaged with the eye 11. In this way the saddle and attaching parts may be sold independently of the cross chain if desired and a cross chain of suitable number of links and length applied by simply unfolding one link with the eye 11 and selecting a proper link 21 when the device is to be applied to the wheel and tire and engaged with the bolt 15.

The flange 13 and seat 14, in combination with the slot 19 and the arm part 18, form an effective and rigid support for the outer end of the bolt and at the same time they enable the ready application and release of the chain.

It is obvious that various changes and modifications may be made in the details of construction and design of the above specifically described embodiment of this invention without departing from the spirit thereof, such changes and modifications being restricted only by the scope of the following claims:

What is claimed is:—

1. In an improved anti-skid device for vehicle wheels having fellys and tires, a saddle engaged detachably with the felly and having one end adapted to receive permanently an end of a cross chain, a screw bolt having axially sliding movement with said saddle having a hook thereon for engaging with the other end portion of the cross chain, and means carried by the saddle for retaining the cross chain on the hook.

2. In an improved anti-skid device for vehicle wheels having fellys and tires, a saddle attached to one end of a cross chain, a bolt axially slidable through said saddle and having a hook for engaging the other end portion of the cross chain, and a slotted arm for receiving the hook of the bolt.

3. In an improved anti-skid device for vehicle wheels having fellys and tires, a saddle connected at one end to a cross chain, a slidable bolt carried by said saddle, a nut for tightening said bolt, and a slotted arm carried by the saddle for receiving a portion of the bolt and acting as a keeper therefor, said portion of the bolt adapted to receive the other end part of the cross chain.

4. In an improved anti-skid device for vehicle wheels having fellys and tires, a saddle connected to one end of a cross chain and having an arm extending outwardly therefrom with an out-turned flange having a seat therein, a second arm secured to the saddle and extending in substantially parallel relation with the first arm, said second arm having a slot therein, and a bolt adjustably carried by said second arm adapted to occupy said seat and having a hook thereon for sliding in the slot in the second arm, said hook adapted to receive the opposite end portion of the cross chain.

5. In an improved anti-skid device for vehicle wheels having fellys and tires, a saddle having a bendable eye for receiving one end of a cross chain, an arm on the saddle having a seat, a bolt removably fitted to said seat and having a hook with an inclined inner face and corner socket for receiving the opposite end portion of the cross chain, an arm carried by the saddle for receiving freely therethrough said bolt, said arm having a slot to slidably receive the hook of the bolt, enlargements on said bolt, lugs on said arm, a nut threaded on the bolt and having recesses to receive said lugs, the inner end of the bolt being constructed to secure the nut thereon.

6. In an anti-skid device for a vehicle wheel having a felly, a saddle adapted to receive one end of a cross chain, a hook bolt slidably carried by the saddle and adapted to receive the opposite end of the cross chain and means carried by the saddle for retaining the cross chain on the hook bolt.

In testimony whereof, I have affixed my signature.

ALEXIS F. GILLET.